United States Patent

Hashish

(10) Patent No.: US 8,912,695 B2
(45) Date of Patent: Dec. 16, 2014

(54) INDUCTION MOTOR AUXILIARY COOLING SYSTEM

(75) Inventor: Emam Hashish, Cincinnati, OH (US)

(73) Assignee: Siemens Industry, Inc., Alpharetta, GA (US)

( * ) Notice: Subject to any disclaimer, the term of this patent is extended or adjusted under 35 U.S.C. 154(b) by 300 days.

(21) Appl. No.: 13/552,048

(22) Filed: Jul. 18, 2012

(65) Prior Publication Data

US 2014/0021812 A1 Jan. 23, 2014

(51) Int. Cl.
*H02K 5/20* (2006.01)
*H02K 9/18* (2006.01)
*H02K 9/06* (2006.01)
*H02K 9/00* (2006.01)

(52) U.S. Cl.
USPC ................. 310/63; 310/53; 310/54; 310/58; 310/59; 310/62

(58) Field of Classification Search
CPC ............ H02K 5/18; H02K 5/20; H02K 9/02; H02K 9/04; H02K 9/06; H02K 15/00; H02K 15/0006; H02K 15/14
USPC .............................. 310/52, 54, 58, 59, 62, 63
See application file for complete search history.

(56) References Cited

U.S. PATENT DOCUMENTS

| 7,923,875 B2 * | 4/2011 | Henry et al. ............... 310/89 |
| 2011/0068644 A1 * | 3/2011 | Kamp ............................ 310/53 |

FOREIGN PATENT DOCUMENTS

WO    WO 2006108550 A1 * 10/2006

OTHER PUBLICATIONS

Tesch et al., English Translation of WO 2006/108550 A1, Electric Motor, Oct. 19, 2006, WIPO.*

* cited by examiner

*Primary Examiner* — John K Kim
*Assistant Examiner* — Rashad Johnson

(57) ABSTRACT

A totally enclosed fan cooled (TEFC) induction motor or other type of induction motor auxiliary cooling system has a buffet thermal shroud that is oriented in opposed spaced relationship over existing motor housing cooling fins. An airflow channel is defined between the motor cooling fins and the shroud, for direction and passage of a cooling airflow. Tabs are oriented in the airflow channel between opposed cooling fins where they are in thermal and fluid communication with the cooling air flow. In some embodiments the tabs are shroud fingers that project inwardly from the shroud. The tabs or shroud fingers create turbulence in the cooling air flow that increases convective heat transfer efficiency and contact time between the cooling air and motor cooling fins. Tabs or shroud fingers also absorb heat from the cooling air flow. Shroud fingers also transfer that absorbed heat conductively to the shroud.

15 Claims, 5 Drawing Sheets

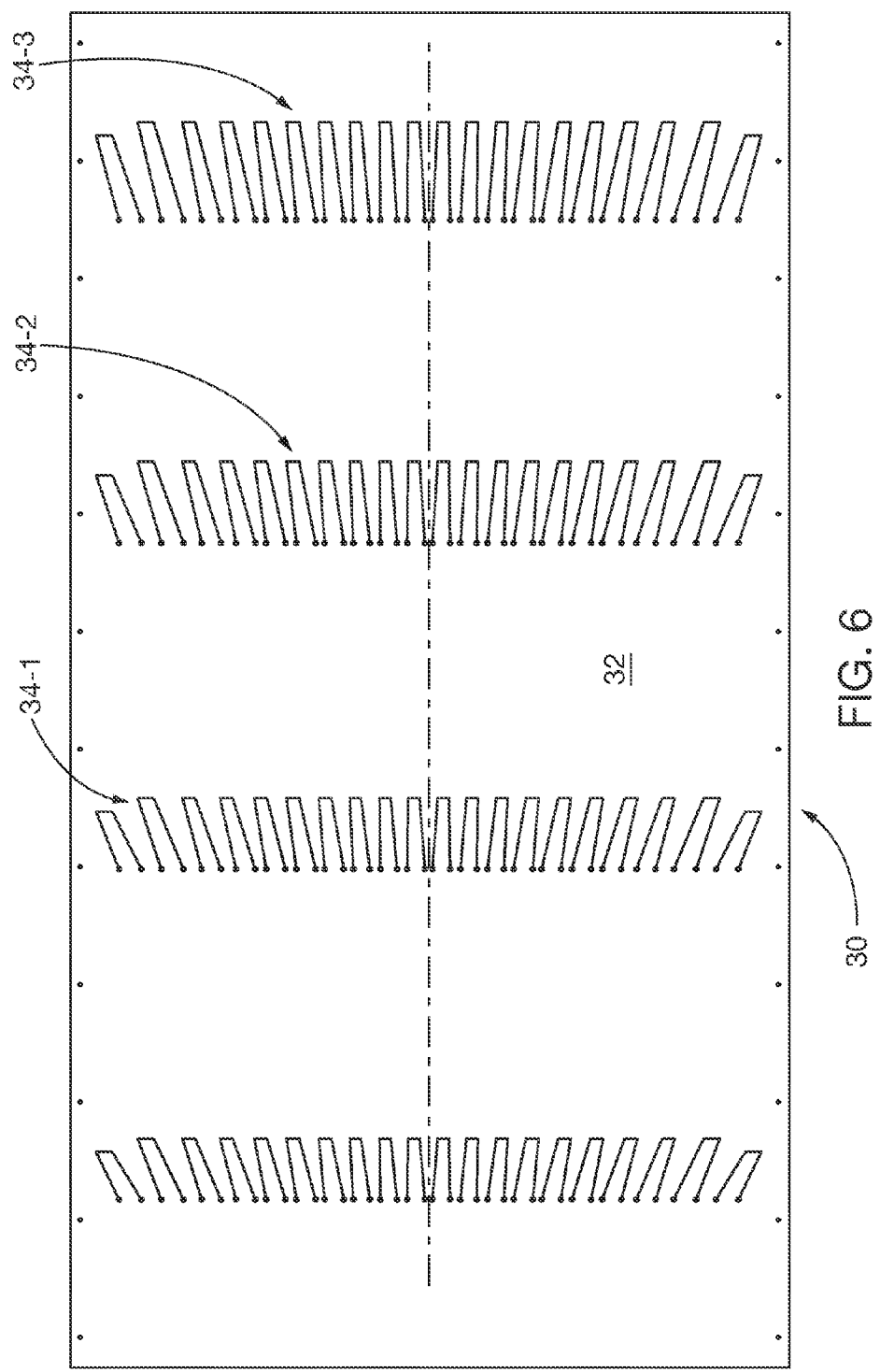

INDUCTION MOTOR AUXILIARY COOLING SYSTEM

BACKGROUND OF THE DISCLOSURE

1. Field of the Invention

The invention relates to induction motor auxiliary external cooling systems, and more particularly to external auxiliary cooling systems for totally enclosed fan cooled (TEFC) induction motors that enhance external transfer away from the motor housing and cooling efficiency.

2. Description of the Prior Art

Known TEFC motors are sealed from ambient air, and are often used in harsh environments—weather related or potentially volatile atmospheres that are not suitable for exposure to live electrical power sources. Generally TEFC motors dissipate internal heat by conductive heat transfer through the motor housing. Housing heat transfer is often enhanced by addition of rows of cooling fins projecting from the housing and an external fan/fan shroud that directs cooling air over the external cooling fins. External fan-induced airflow over the fins enhances convective heat transfer away from the motor cooling fins to ambient atmosphere. It is challenging to provide sufficient external cooling air flow over TEFC motor cooling fins—especially when the motor is subjected to a heavy external driven load operating condition. Often a TEFC motor housing or yoke is constructed of cast iron or cast steel, with integrally cast cooling fins. Those metals have lower thermal conductivity than other metals, such as copper or aluminum. Copper or aluminum may not have sufficient structural strength for higher power induction motor housings. It is not always economically feasible to construct TEFC motor housings from steel or cast iron, and then attach higher conductivity copper or aluminum cooling fins to the housing exterior. An additional heat transfer challenge for TEFC motors is their use of exterior paint and/or sound-deadening coatings that are relatively poor thermal conductors. Those coatings further degrade heat transfer capabilities of TEFC motor housings.

Under extreme motor load conditions the only practical recourse may be to substitute a more expensive totally enclosed water cooled motor for a TEFC motor. While the substitution may be acceptable for new motor installations, it may not be practical or cost effective to swap out a TEFC motor for new water cooled motor if the shop floor does not have an available cooling water source. Some operating environments are not suitable for water cooled motors. Retrofitting a water cooled motor for an otherwise adequately functional TEFC motor is disruptive to shop activities, requires capital purchase and installation costs for the replacement motor, and costs associated with discarding the old motor. It is more desirable to retrofit existing TEFC motors with enhanced cooling capabilities rather than swap them out with totally enclosed water cooled motors. New enhanced cooled TEFC motors give motor users more flexibility in choosing motor types suitable for their applications.

SUMMARY OF THE INVENTION

Accordingly, an object of the invention is to enhance cooling capabilities of existing induction motors, including totally enclosed fan cooled (TEFC) induction motors, by retrofitting them quickly in the field at low cost and with relatively little effort.

Another object of the invention is to build new induction motors, including totally enclosed fan cooled (TEFC) motors, or rebuild older motors during scheduled service and maintenance intervals, that have enhanced cooling capabilities, but with minimal modifications to existing designs and building practices.

These and other objects are achieved in accordance with the present invention by an auxiliary cooling system for induction motors, including TEFC motors, that can be retrofitted quickly in the field at low cost and with relatively little effort. The auxiliary cooling system of the present invention can be incorporated into present TEFC motor or other types of induction motor manufacturing and rebuild service center building processes without extensive redesign effort or modification to existing component designs.

The present invention induction motor auxiliary cooling system, including for TEFC motors, has a buffet thermal shroud that is attached over existing motor housing cooling fins in spaced relation. An airflow channel is defined between the motor cooling fins and the shroud, for direction and passage of a cooling airflow. Tabs are oriented in the airflow channel between opposed cooling fins where they are in thermal and fluid communication with the cooling air flow. In some embodiments the tabs are shroud fingers that project inwardly from the shroud. The tabs or shroud fingers create turbulence in the cooling air flow that increases convective heat transfer efficiency and contact time between the cooling air and motor cooling fins. Tabs or shroud fingers also absorb heat from the cooling air flow. Shroud fingers also transfer that absorbed heat conductively to the shroud. More efficient heat transfer from the motor to the cooling air flow over a longer convective contact time enhances overall cooling efficiency of the motor by only the addition of one or more buffet thermal shrouds and tabs.

Embodiments of the invention feature an induction motor, comprising a motor housing, having an exterior surface with spaced motor cooling fins. The motor has a buffet thermal shroud oriented in opposed spaced relationship over the motor cooling fins. An airflow channel is defined between the cooling fins and the shroud, for direction and passage of a cooling airflow. A plurality tabs are oriented in the airflow channel between opposed cooling fins, where they are in thermal and fluid communication with the cooling air flow.

Other embodiments of the invention feature a kit having component parts capable of being assembled to provide auxiliary cooling for an induction motor having an exterior surface with spaced motor cooling fins. The kit comprises a buffet thermal shroud adapted for orientation in opposed spaced relationship over the motor cooling fins. After the orientation, the shroud is adapted for defining an airflow channel between itself and the cooling fins, for direction and passage of a cooling air flow. A plurality tabs are adapted for orientation in the airflow channels between apposed cooling fins, so that when so oriented they are in thermal and fluid communication with the cooling air flow.

Yet other embodiments of the invention feature a totally enclosed fan cooled (TEFC) induction motor, with a motor housing having an exterior surface with spaced motor cooling fins; and a coating fan within a fan housing for generating and directing a cooling airflow that is in communication with the cooling fins. The TEFC motor has a buffet thermal shroud oriented in opposed spaced relationship over the motor cooling fins. An airflow channel is defined by the fan housing, cooling fins and the shroud, for direction and passage of the cooling air flow. A plurality of tabs are in the airflow channel between opposed cooling fins, where they are in thermal and fluid communication with the cooling air flow.

The objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which:

FIG. 6 is a plan view of a bullet thermal shroud of FIG. 1 prior to final bending;

To facilitate understanding, identical reference numerals have been used, where possible, to designate identical elements that are common to the figures.

DETAILED DESCRIPTION

After considering the following description, those skilled in the art will clearly realize that the teachings of my invention can be readily utilized in induction motors, such as TEFC motors, to provide auxiliary cooling system that increases convective heat transfer efficiency and contact time between the cooling air and motor cooling fins. The cooling system of the present invention has a buffet thermal shroud that is oriented in opposed spaced relationship over existing motor housing cooling fins. An airflow channel is defined between the motor cooling fins and the shroud, for direction and passage of a cooling airflow. Tabs are oriented in the airflow channel between opposed cooling fins where they are in thermal and fluid communication with the cooling air flow. In some embodiments the tabs are shroud fingers that project inwardly from the shroud. The tabs or shroud fingers create turbulence in the cooling air flow that increases convective heat transfer efficiency and contact time between the cooling air and motor cooling fins. Tabs or shroud fingers also absorb heat from the cooling air flow. Shroud fingers also transfer that absorbed heat conductively to the shroud.

Figure 1:
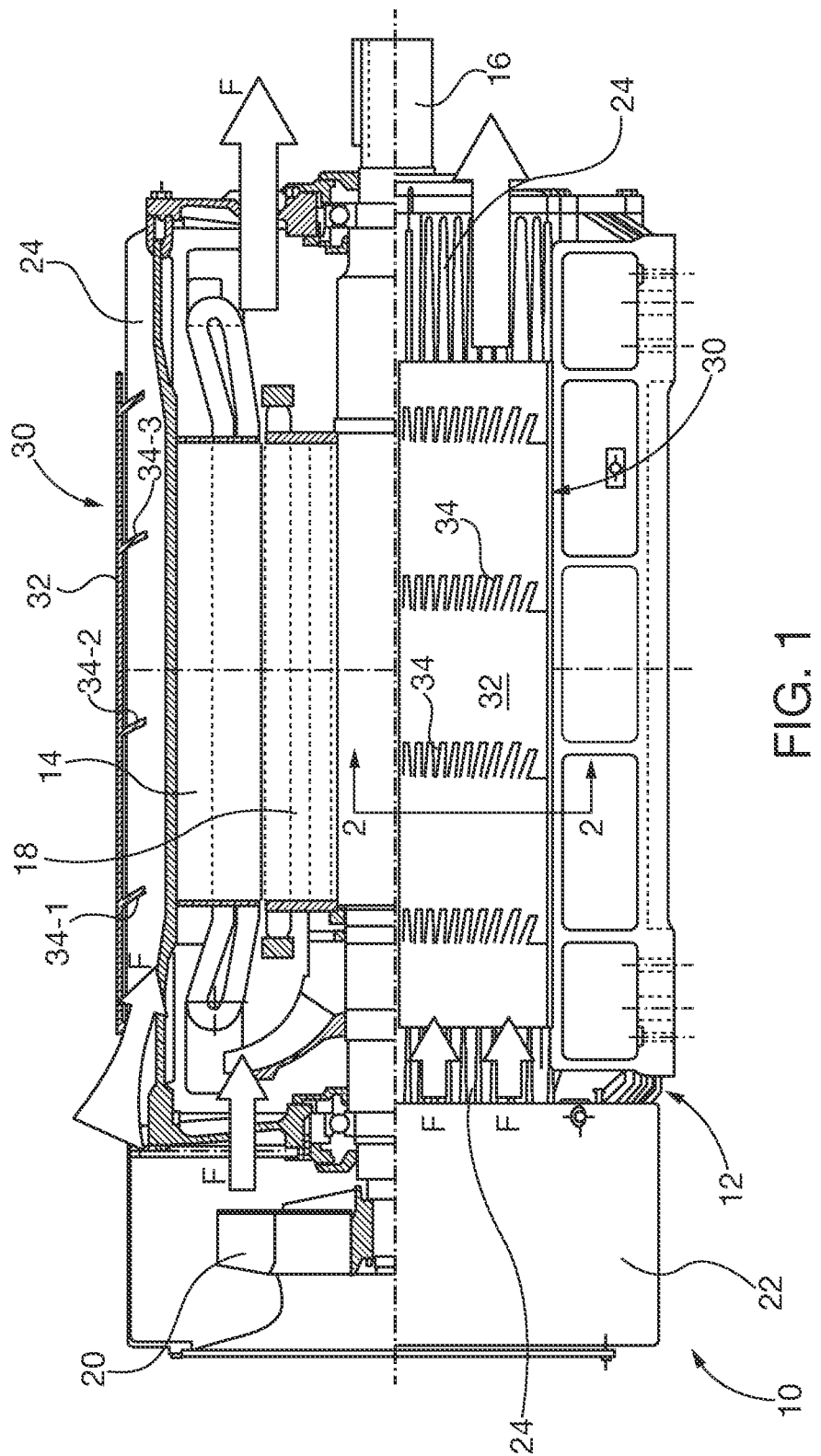
FIG. 1 shows a partial cross-sectional devotional view of a totally enclosed fan cooled (TEFC) induction motor with the cooling system buffet thermal shroud of the present invention.

FIG. 1 shows an exemplary TEFC induction motor 10 of known internal construction, including a motor housing or yoke 12, a stator core 14, a rotor shaft 16, to which is mounted a rotor core 18 and a rotor shaft-driven external cooling fan 20. The cooling fan 20 is oriented within a fan housing 22 having an outlet that in communication with circumferentially spaced motor housing cooling fins 24. The cooling fins are generally parallel to the rotor shaft. Cooling airflow F exhausts the fan housing and is directed over the cooling fins 24 to enhance heat transfer rate from the fins to surrounding ambient air.

Figure 2:
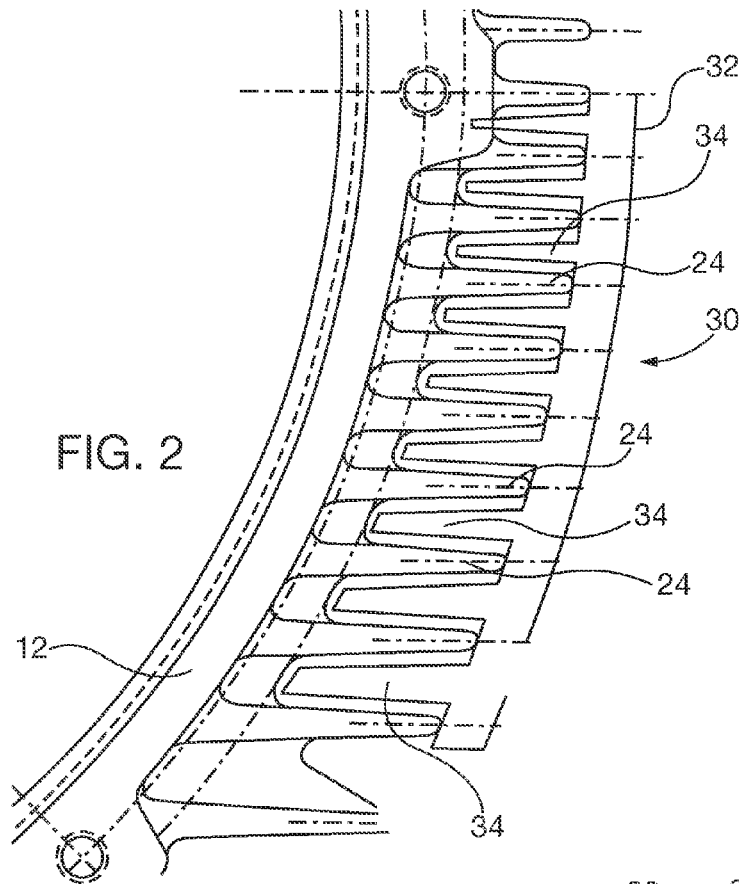
FIG. 2 is a partial radial cross-section of the motor taken along 2-2 of FIG. 1.
Figure 3:
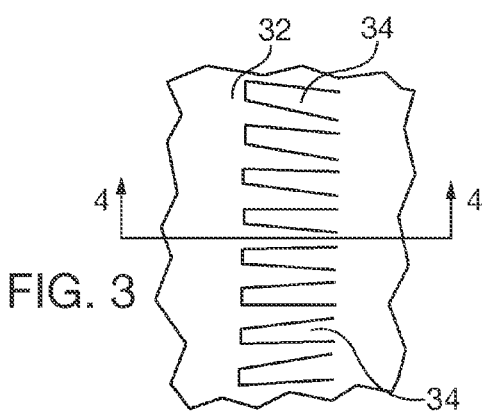
FIG. 3 is a fragmentary plan view of a buffet thermal shroud of the cooling system of the present invention.
Figure 4:
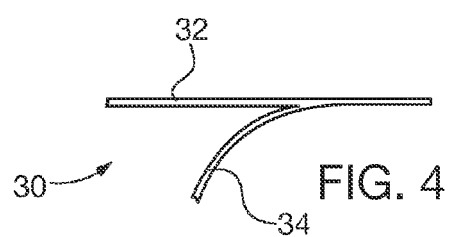
FIG. 4 is a cross section of the shroud taken along 4-4 of FIG. 3.

As shown in FIGS. 1 and 2, the auxiliary cooling system comprises a buffet thermal shroud 30 that is oriented in opposed spaced relationship over the motor cooling fins 24 proximal an outlet portion of the fan housing 22. Shroud 30, in cooperation with the cooling fins 24 defines an airflow channel for direction and passage of cooling airflow F that is generated by the cooling fan 20. In this way the cooling airflow F remains in thermal and fluid communication with the cooling fins 24 and the shroud 30 from the fan housing 22 outlet to the distal axial end of the motor 10.

Figure 5:
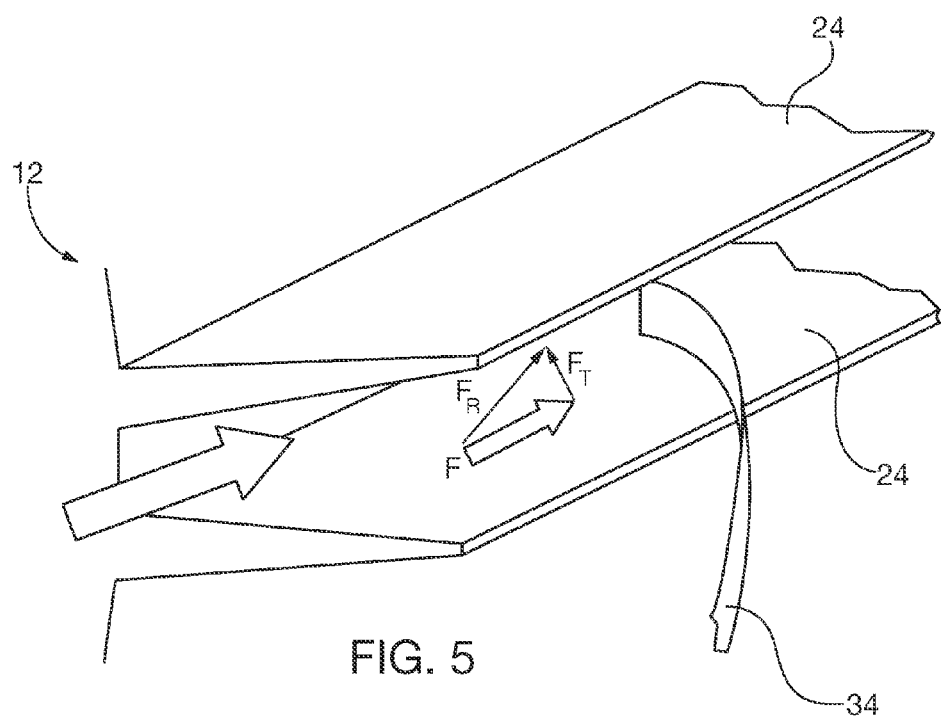
FIG. 5 is a fragmentary schematic view showing cooling air flow between the cooling system buffet thermal shroud of FIG. 1 and motor cooling fins.
Figure 7:
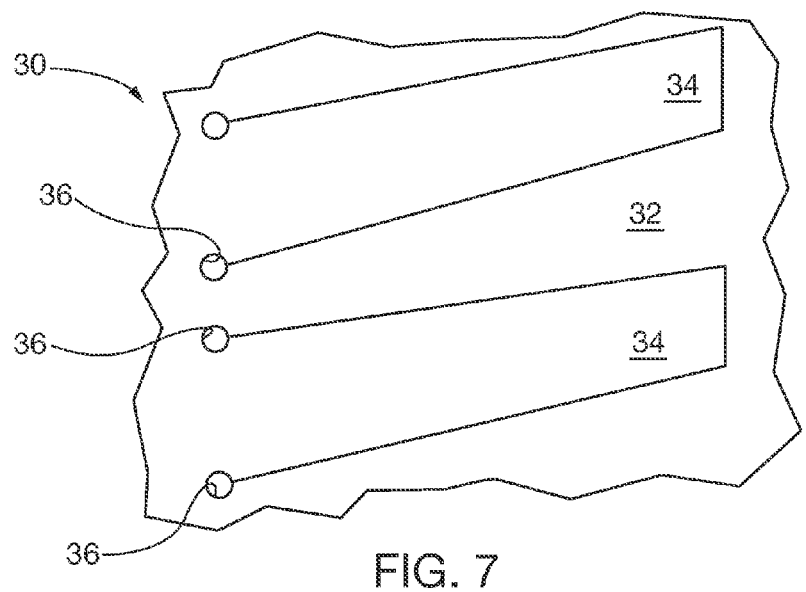
FIG. 7 is a detailed fragmentary plan view of the buffet thermal shroud of FIG. 6.

The auxiliary cooling system also comprises a plurality of plurality tabs in the airflow channel between opposed cooling fins, where they are in thermal and fluid communication with the cooling air flow F. As shown in FIGS. 1-6, the tabs are shroud fingers 34 that project inwardly from a generally planar shroud body 32 between pairs of opposed cooling fins 24. The shroud body 32 is shaped to conform to the generally cylindrical circumferential shape of the motor housing 12. As shown in FIGS. 2 and 5, the tabs/shroud fingers 34 project into the airflow path F between a pair of opposed cooling fins 24, where they direct airflow F inwardly tangentially ($F_T$) from the finger 34 contact surfaces in a resultant direction $F_R$. Thus the shroud fingers direct airflow component $F_R$ toward the cooling fin 24 for increased contact dwell time (hence, more heat transfer time) from the end of shroud 30 that is proximal the fan housing 22 to the distal end of the motor 10. The tabs or shroud fingers 34 also create turbulence in the cooling air flow F that increases convective heat transfer efficiency and contact time between the cooling air and motor cooling fin 24. Fluttering motion of the shroud fingers further enhances turbulence.

Figure 8:
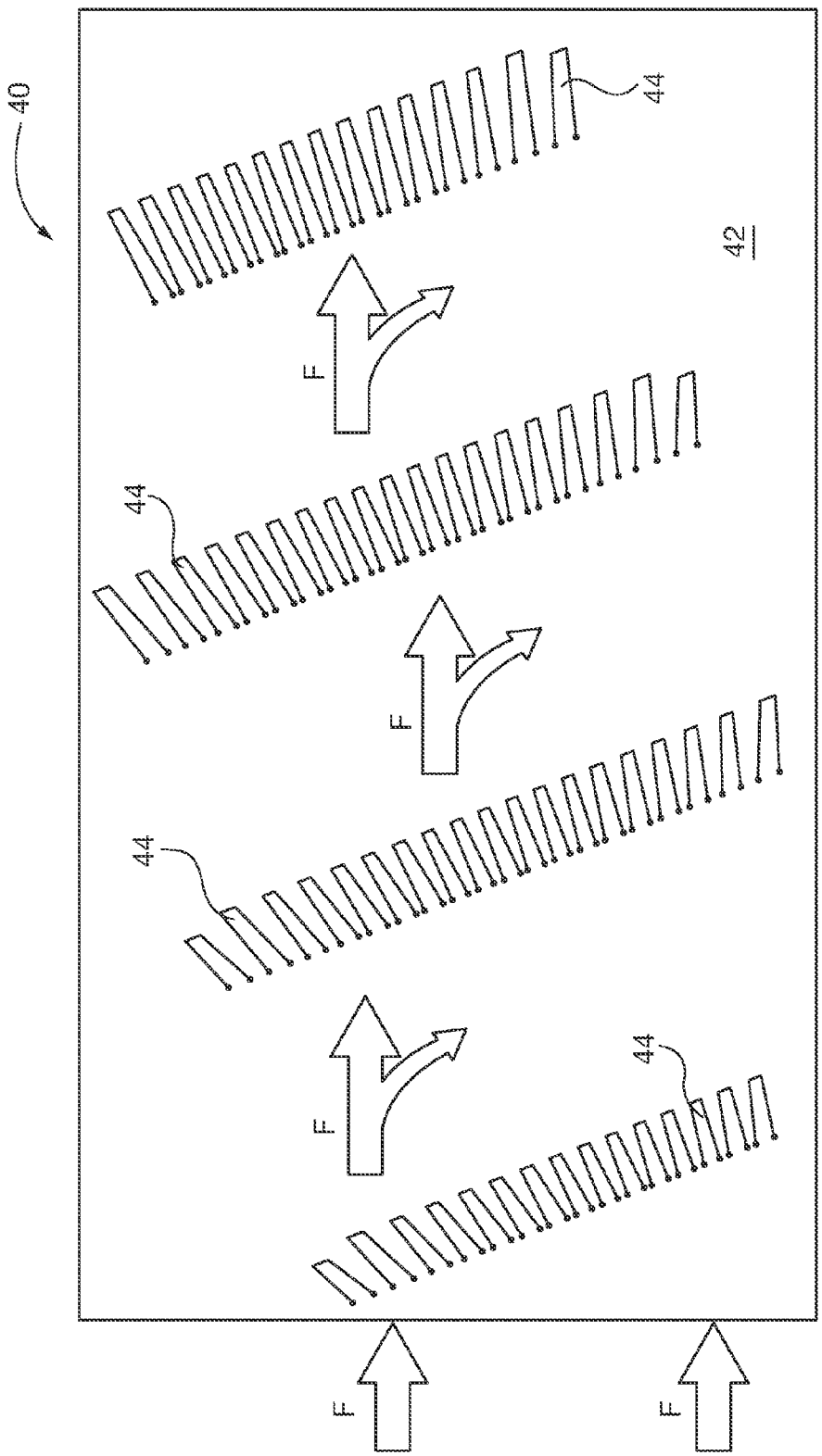
FIG. 8 is a schematic view showing cooling air flow in an alternative embodiment buffet thermal shroud.

The auxiliary cooling system shroud 30 embodiment shown in FIG. 1 has a plurality of the tab shroud fingers 34 oriented in parallel radial and axial arrays about the motor 10 circumference, preferably with a row of fingers 34 between each pair of opposed cooling fins 24. The shroud finger 34 length can be varied further to modify airflow F between cooling fins 24. As shown, the row series of respective shroud fingers 34-1, 34-2 and 34-3 are progressively longer than the prior finger in the series from proximal the fan housing 22 airflow outlets to the distal end of the motor 10. This way turbulent airflow over each of the shroud finger 34-1 to 34-3 is maintained even as the airflow F speed diminishes along the axial flowpath. Tab array patterns can be selected to achieve any desired airflow pattern between the shroud 30 and motor cooling fins 24. For example, as shown in FIG. 8, the auxiliary cooling system buffet thermal shroud 40 has a pattern of helically-oriented tabs 44 to promote swirling circumferential and axial flow that may inhibit accumulation of debris in the air channel between the shroud and the motor.

Other alternative embodiments of the buffet thermal shroud may be fabricated for different auxiliary motor cooling applications. In FIG. 6, the buffet thermal shroud 30 is formed from a flat sheet metal shroud body 32 with integrally formed lanced shroud fingers 34 that may be cut by any known metal working method, including stamping or laser cutting. Small circular holes 36 are advantageously formed in advance of making the longer skewed finger cuts to avoid sharp cuts as well as stress concentrations that might arise from the fingers fluttering in the cooling airflow stream F. The cut slope used to form each individual finger 34 is determined by the chosen finger length (e.g., 34-1 to 34-3) and the dimensional relationship of the motor housing curvature when the flat sheet shroud body 32 is bent to conform to the motor housing 12 curvature. Often the cooling fins 24 are oriented in true horizontal or vertical parallel planes relative to the motor housing 10, rather than in radial symmetry about the housing circumference. It is also desirable to coat the shroud body 32 side facing the motor 10 with a heat-absorbing, coating and the side facing away from the motor is with a heat reflecting surface. For example, the shroud body can be fabricated from stainless steel sheet with its exterior side remaining in raw polished state and the interior side painted with flat black paint. Alternatively the buffet thermal shroud forming the auxiliary cooling system of the present invention can comprise cast metal, plastic, molded plastic and composite structures, in addition to the previously described embodiments constructed of sheet metal. The tabs can be separate components that are attached to the buffet thermal shroud, rather than being integrally formed therein. The tabs also can be one or a plurality of integrally attached tabs that are a separate component interlocked or otherwise captured between the buffet thermal shroud and the motor housing.

The shroud 30 is easily oriented and affixed to newly manufactured or rebuilt motors 10 while they are in the manufacturing or repair facility. A buffet thermal shroud 30 also can be retrofitted to motors 10 already installed in the field as part of a field installation kit of parts simply by attaching it to the motor. For ease of shop or field installation a plurality of separate shrouds 30 can be installed along different portions of the motor 10 circumference—for example one on the top and each of the flanking sides of the motor housing 12. No internal motor modifications are necessary to utilize the auxiliary cooling system of the present invention. The motor housing 10 and its cooling fins 24 do not necessarily need to be modified for application of the present invention auxiliary cooling system shroud 30, except possibly for minimal accommodation to mount the shroud to the motor 10.

Although various embodiments, which incorporate the teachings of the present invention, have been shown and described in detail herein, those skilled in the art can readily devise many other varied embodiments that still incorporate these teachings.

What is claimed is:

1. An induction motor, comprising:
    a motor housing having an exterior surface with spaced motor cooling fins;
    a buffet thermal shroud oriented in opposed spaced relationship over the spaced motor cooling fins;
    an airflow channel defined between the spaced motor cooling fins and the shroud, for direction and passage of a cooling airflow; and
    a plurality of tabs in the airflow channel between the spaced motor cooling fins, where the plurality of tabs is in thermal and fluid communication with the cooling air flow,
    wherein the plurality of tabs is oriented in an array, and
    wherein the plurality of tabs are of different respective lengths between the spaced motor cooling fins.

2. The motor of claim 1, the plurality of tabs further comprising a series of respective tabs that are progressively longer than a prior tab within the series.

3. The motor of claim 1, comprising the plurality of tabs in an array of parallel rows.

4. The motor of claim 1, comprising the plurality of tabs in a helical array.

5. The motor of claim 1, the plurality of tabs comprising shroud fingers projecting inwardly from the shroud.

6. The induction motor of claim 1, the buffet thermal shroud comprising material selected from a group consisting of cast metal, sheet metal, plastic, molded plastic and composite structures.

7. The motor of claim 5, the plurality of tabs comprising the shroud fingers being bent tabs lanced from the shroud.

8. A kit having component parts capable of being assembled to provide auxiliary cooling for an induction motor having an exterior surface with spaced motor cooling fins, comprising:
    a buffet thermal shroud adapted for orientation in opposed spaced relationship over the spaced motor cooling fins, after said orientation, the shroud adapted for defining an airflow channel between itself and the spaced motor cooling fins, for direction and passage of a cooling air flow; and
    a plurality of tabs adapted for orientation in the airflow channels between the spaced motor cooling fins, so that when so oriented are in thermal and fluid communication with the cooling air flow,
    wherein the plurality of tabs are oriented in an array, and
    wherein the plurality of tabs are of different respective lengths between the spaced motor cooling fins.

9. The kit of claim 8, comprising the plurality of tabs in an array of parallel rows.

10. The kit of claim 8, comprising the plurality of tabs in a helical array.

11. The kit of claim 8, the plurality of tabs comprising shroud fingers projecting inwardly from the shroud.

12. The kit of claim 11, the plurality of tabs comprising the shroud fingers being bent tabs lanced from the shroud.

13. The kit of claim 11, the shroud comprising material selected from a group consisting of cast metal, sheet metal, plastic, molded plastic and composite structures.

14. A totally enclosed fan cooled (TEFC) induction motor, comprising:
    a motor housing having an exterior surface with spaced motor cooling fins;
    a cooling fan within a fan housing for generating and directing a cooling airflow that is in communication with the spaced motor cooling fins;
    a buffet thermal shroud oriented in opposed spaced relationship over the spaced motor cooling fins,
    an airflow channel defined by the fan housing, the spaced motor cooling fins and the shroud, for direction and passage of the cooling air flow; and
    a plurality of tabs in the airflow channel between the spaced motor cooling fins, where the plurality of tabs is in thermal and fluid communication with the cooling air flow, the plurality of tabs comprising shroud fingers projecting inwardly from the shroud, the shroud fingers oriented in an array of parallel rows;
    wherein the spaced motor cooling fins comprises a pair of spaced motor cooling fins oriented parallel to airflow from the cooling fan and the fan housing; and
    wherein a series of fingers is aligned in a row between the pair of spaced motor cooling fins from proximal to distal of the cooling fan and the fan housing, each distal finger in the row being progressively longer than each prior finger.

15. The totally enclosed fan cooled (TEFC) induction motor of claim 14, the buffet thermal shroud comprising material selected from a group consisting of cast metal, sheet metal, plastic, molded plastic and composite structures.

* * * * *